K. M. TURNER & H. W. HAFF.
TELEPHONE APPARATUS.
APPLICATION FILED JAN. 6, 1909.
933,404.
Patented Sept. 7, 1909.
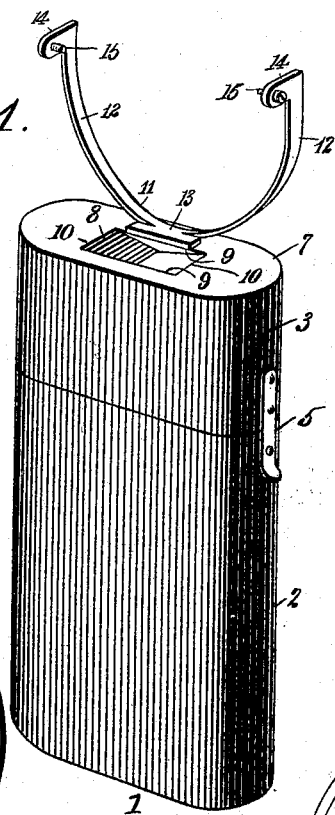
Fig. 1.
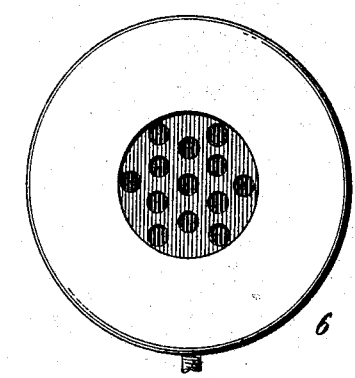
Fig. 3.
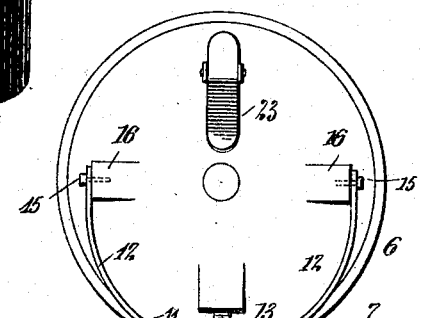
Fig. 2.
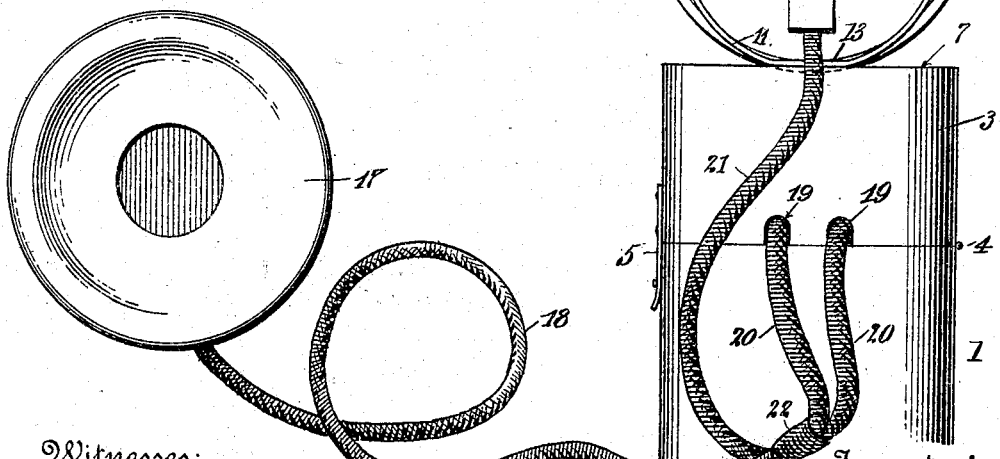
Witnesses:
Inventors:
Kelly M. Turner
Horace W. Haff
By their Attorneys
Rosenbaum & Stockbridge KELLEY M. TURNER, OF NEW YORK, AND HOWELL W. HAFF, OF BABYLON, NEW YORK, ASSIGNORS TO GENERAL ACOUSTIC COMPANY, A CORPORATION OF NEW YORK.

TELEPHONE APPARATUS.

933,404.   Specification of Letters Patent.   Patented Sept. 7, 1909.

Application filed January 6, 1909. Serial No. 470,944.

*To all whom it may concern:*

Be it known that we, KELLEY M. TURNER and HOWELL W. HAFF, citizens of the United States, residing, respectively, at the city of New York, borough of Manhattan, and at Babylon, in the county of Suffolk, State of New York, have invented certain new and useful Improvements in Telephone Apparatus, of which the following is a full, clear, and exact description.

Our invention relates to telephonic apparatus adapted to be used by deaf persons and comprising a portable transmitter, receiver and battery, which are so disposed and carried as to establish a sound reproducing circuit. The transmitter and the battery are most conveniently carried in the pockets or hung upon the garments, while the receiver has a flexible cord connection in the circuit whereby it may be placed to the ear when required. A very simple arrangement consists of a transmitter and battery organized into a single part or element and adapted to be placed in a vest pocket, the battery supporting the transmitter in a position to most advantageously receive the sound to be reproduced. This arrangement has some disadvantages, among them that the transmitter is covered by the coat or outer garment, and it is frequently preferable to hang the transmitter directly on the outside of the coat (or other garment in the case of ladies' use) and have the battery in any pocket or part of the person which is most convenient. It is evident that an instrument has the widest field of use which is adapted to serve in either of the foregoing ways.

It is the purpose of our present invention to provide such an instrument or apparatus, in which the battery and transmitter may either be assembled together into a unitary structure as first described, or disassociated and used separately, being merely connected by the circuit wires in the latter instance. We aim to have the attachment of the transmitter on the battery very secure and positive when associated, but disassociated by a very simple manipulation. When the parts are used separately, they have substantially all the characteristics of the usual outfit designed and manufactured only for this single purpose.

With the foregoing and other objects in view, our invention consists in the features of construction and combination as hereinafter set forth and claimed.

In the drawings: Figure 1 is a perspective view of a battery case for an apparatus embodying the principles of our invention; Fig. 2 is a rear view of the same with the transmitter attached and the receiver in circuit; Fig. 3 is a front view of the transmitter.

Referring to the drawings, 1 designates a battery case of the usual flat form with rounded side edges 2 adapted to fit snugly in an ordinary vest or other pocket. The case has a cover 3 hinged thereto at one side 4, and engaged in its closed relation by a spring clasp 5.

6 denotes a transmitter adapted to be clasped to the battery case 1, or used separately therefrom as desired. We have illustrated a very simple, but positive connecting means by which these functions are readily secured.

As particularly shown in Fig. 1, the upper surface 7 of the battery case cover 3, has a recess or depression 8 therein, the most prominent characteristic of the depression being that it has side edges 9 parallel to and separated from one another by a distance equal to the thickness of the transmitter 6. The depth of the depression is sufficient to receive the rounded outline of the transmitter, with the periphery of the latter resting against the end edges 10. Under these circumstances the transmitter is definitely located on the top of the battery case and is more or less firmly positioned in a proper vertical relation dependent upon the snugness of the fit of the two side edges 9. In practice the depression 8 is merely punched into the top of the battery case cover, by driving a portion of the metal inward, the metal being sheared at the sides and drawn into a curved or other suitable outline, retaining its connection at the end edges 10. Fixed upon the face 7 of the cover there is also provided a U-shaped spring clamp 11, the two arms 12 of which are substantially rigid against displacement in any direction except toward and from one another. This result is easily secured by the form of the arms, the width of their transverse section being less in the general plane of curvature of the clamp than the length thereon in a transverse direction. The entire clamp is metal with a base 13 which may be soldered or otherwise fixed to the cover 3, and laterally deflected ears 14 at the extremities of the arms which have inwardly directed pins 15. The rear face of the transmitter 6 is stamped or embossed with protuberances 16 behind which the pins 15 are adapted to engage. In this relation the transmitter is held vertically above the recess 8 of the cover, into which it projects slightly in the manner already described.

The circuit connections are established from the battery and transmitter to the receiver 17 through a flexible cord 18 of the ordinary sort. In order to have the circuit connections as neat in appearance as possible, we provide the battery case cover 3 with a pair of notches 19 adjacent to its lower edge through which the separate branches 20 of the battery connection pass. The transmitter connection 21 is made from a point or junction 22 sufficiently distant from the battery to enable the latter to be located in one pocket, while the transmitter is hung on an outer garment in case of its separate use. 23 designates the usual clasp by which the transmitter is attached under these circumstances. In case the transmitter is associated upon the battery case, however, the separate battery leads 20 and the joint 22 are all massed together and pushed into the cover 3, in which case the receiver and transmitter connections 18 and 21, respectively, are passed outward through the slots 19, in place of the separate battery leads, as first described. The apparatus is therefore substantially as neat in either manner of its use, as in the present systems which are individually designed for each separate plan. The transmitter is very firmly associated upon the battery case in use on account of the cess 8 already described, and on account of the comparative stiffness of the arms 12 in a forward or rearward direction. The resiliency of the arms maintains their pins 15 in close engagement with the protuberances 16 of the transmitter, which engagement keeps the transmitter pressed downward closely into its recess 8, resisting any sidewise or lateral movement. The transmitter is quickly disassociated for separate use by springing apart the arms 12, after which it is freely removable.

What we claim is:—

1. A telephone apparatus comprising a transmitter, a receiver, and a battery case, said battery case having a removable cover, flexible cord connections extending from said transmitter and from said receiver and joined to a pair of battery leads, means for fixing said transmitter in rigid but detachable connection on said battery case, said case inclosing a space beneath said cover sufficient to receive said battery leads and the junction thereof with said transmitter and receiver cords when the transmitter is so fixed thereon.

2. A telephone apparatus comprising a battery case having a cover with a depression in its upper face, a pair of spring arms projecting upward from said face, a transmitter adapted to be inset in said depression and engaged by said arms, a receiver, and flexible cord connections to establish a telephone circuit.

In witness whereof, we subscribe our signatures, in the presence of two witnesses.

KELLEY M. TURNER.
HOWELL W. HAFF.

Witnesses:
WALDO M. CHAPIN,
WILLIAM LARY.